(12) United States Patent  
Boucard et al.

(10) Patent No.: US 7,765,974 B2
(45) Date of Patent: Aug. 3, 2010

(54) BODY OF A GLOW PLUG PROVIDED WITH A PRESSURE SENSOR

(75) Inventors: Michel Boucard, Tournefeuille (FR); Bernd Last, Reutlingen (DE); Cyrille Patri, Toulouse (FR); Alain Ramond, Merville (FR); John Burrows, Cheshire (GB); Sandro Goretti, Rubiera (IT)

(73) Assignees: Continental Automotive France, Toulouse (FR); Federal-Mogul Ignition Srl, Carpi (IT)

( * ) Notice: Subject to any disclaimer, the term of this patent is extended or adjusted under 35 U.S.C. 154(b) by 564 days.

(21) Appl. No.: 11/587,658

(22) PCT Filed: Apr. 19, 2005

(86) PCT No.: PCT/FR2005/000931

§ 371 (c)(1),
(2), (4) Date: Mar. 8, 2007

(87) PCT Pub. No.: WO2005/111505

PCT Pub. Date: Nov. 24, 2005

(65) Prior Publication Data

US 2007/0266980 A1 Nov. 22, 2007

(30) Foreign Application Priority Data

Apr. 27, 2004 (FR) .................................. 04 04462

(51) Int. Cl.
*F02B 9/08* (2006.01)
*F02P 23/00* (2006.01)

(52) U.S. Cl. ................................ 123/145 A; 123/143 R

(58) Field of Classification Search ............. 123/143 R, 123/145 A, 153, 192.1
See application file for complete search history.

(56) References Cited

U.S. PATENT DOCUMENTS

| 4,354,725 | A | * | 10/1982 | Herbaugh et al. ............ 439/736 |
| 4,655,658 | A | * | 4/1987 | Gulistan ..................... 411/353 |
| 4,919,459 | A | * | 4/1990 | Miller ...................... 285/123.8 |
| 5,006,023 | A | * | 4/1991 | Kaplan ........................ 411/17 |
| 6,360,734 | B1 | * | 3/2002 | Andrews ................... 124/23.1 |

(Continued)

FOREIGN PATENT DOCUMENTS

EP 1 096 141 5/2001

OTHER PUBLICATIONS

Patent Abstract of Japan, vol. 0081, No. 63 (P-290), Jul. 27, 1984 & JP 59 060237 A (Nippon Jidosha Buhin Sogo Kenyusho KK; Others: 01), Apr. 6, 1984 Abstract.

(Continued)

*Primary Examiner*—John T Kwon
(74) *Attorney, Agent, or Firm*—Young & Thompson

(57) ABSTRACT

This body (8) has on its outer surface both a screw thread (16) adapted for fixing the body (8) into a corresponding tapping in an engine (4), as well as a gripping zone (28), generally of cylindrical form with a hexagonal section, enabling gripping of the body (8) for screwing the glow plug (2) into the corresponding tapping. The outer diameter of the portion of the body between the thread (16) and the gripping zone (28) is throughout its entire height of a diameter at least equal to the outer diameter of the threaded portion (16). Application to internal combustion engines, in particular Diesel type engines.

9 Claims, 2 Drawing Sheets

U.S. PATENT DOCUMENTS

Figure 1:
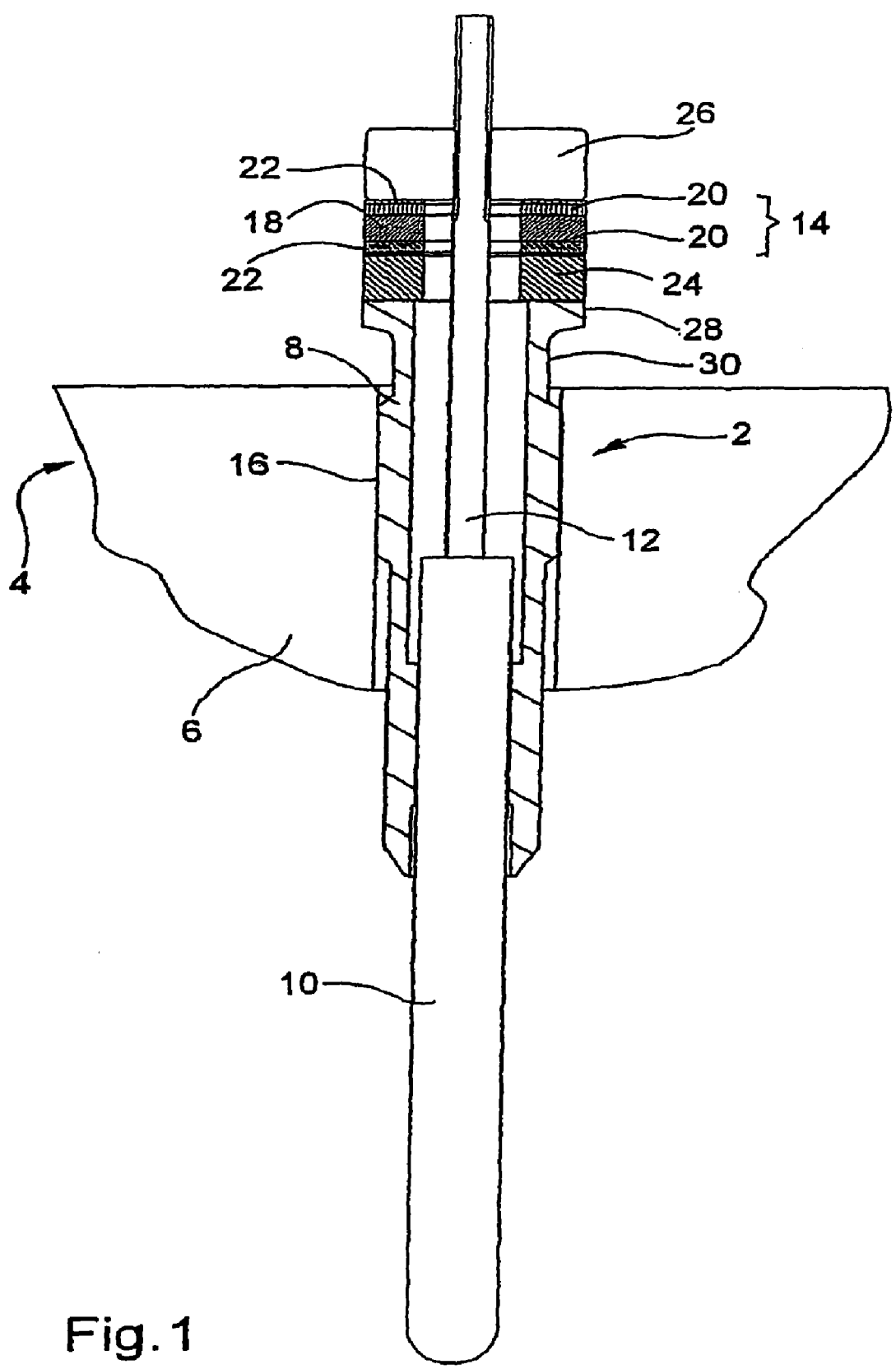

| | | | | |
|---|---|---|---|---|
| 6,459,072 B1 * | 10/2002 | Selmi et al. | | 219/270 |
| 6,539,787 B1 * | 4/2003 | Murai et al. | | 73/114.21 |
| 6,561,741 B2 * | 5/2003 | Garver | | 411/386 |
| 6,936,270 B2 * | 8/2005 | Watson et al. | | 424/423 |
| 6,979,801 B2 * | 12/2005 | Okazaki et al. | | 219/270 |
| 7,001,387 B2 * | 2/2006 | Farris et al. | | 606/287 |
| 7,410,496 B2 * | 8/2008 | Derouet | | 606/290 |
| 7,444,973 B2 * | 11/2008 | Boucard et al. | | 123/179.6 |
| 2002/0039522 A1 * | 4/2002 | Hartmann et al. | | 411/161 |
| 2002/0169162 A1 * | 11/2002 | Smith et al. | | 514/248 |
| 2003/0018335 A1 * | 1/2003 | Michelson | | 606/61 |
| 2003/0045880 A1 * | 3/2003 | Michelson | | 606/70 |

OTHER PUBLICATIONS

Patent Abstracts of Japan, VIL. 0082, No. 62 (M-341), Nov. 30, 1984 & JP 59 134341 A (Nippon Jidosha Buhin Sogo Kenkyusho KK), Aug. 2, 1984 Abstract.

* cited by examiner

BODY OF A GLOW PLUG PROVIDED WITH A PRESSURE SENSOR

The present invention concerns a glow plug body comprising a pressure sensor.

In an internal combustion engine, in particular a Diesel engine, it has been noted that the knowledge of the value of the pressure within a cylinder makes it possible to better control the progress of the combustion in that cylinder. This information may in particular serve for the regulation of the injection of fuel into the cylinder. The knowledge of this pressure thus makes it possible to reduce the polluting emissions of the engine, increase the efficiency of the engine and thus reduce its fuel consumption.

The integration of a pressure sensor in the glow plug makes it possible to measure that pressure without requiring a specific location on the engine cylinder head. This integration is also advantageous since it avoids having to make an additional bore opening into each cylinder. Problems of fluid-tightness are thus avoided.

It is thus known to provide the head of a glow plug with a piezo-electrical sensor. Glow plug head means the part of that glow plug which is situated outside the cylinder head, that is to say at the opposite end of the glow plug to the heating part thereof inserted into the combustion chamber. Solutions of the prior art propose to situate the pressure sensor between the body of the glow plug on which it bears, and a nut fastened to the upper end of a core which transmits electrical energy to the pre-heating electrode of the glow plug and which extends the finger receiving that electrode in the body and beyond, by passing through the sensor.

Such a glow plug of the prior art makes it possible to measure the pressure exerted within the combustion chamber on the glow plug finger. However, other signals become superposed on the signal corresponding to the pressure measured. These extraneous noises should be got rid of in order to be able to make a good measurement of the ambient pressure within the combustion chamber of the cylinder considered.

The present invention is therefore directed to providing a glow plug that is less sensitive to signals which do not correspond to the ambient pressure within the combustion chamber than the glow plugs of the prior art comprising a pressure sensor.

To that end, it provides a body of a glow plug comprising a pressure sensor, the body having on its outer face both a thread adapted for fixing the body into a corresponding tapping of an engine, as well as a gripping zone, generally of cylindrical form with a hexagonal section, enabling gripping of the body for screwing the glow plug into the corresponding tapping.

According to the present invention, the outer diameter of the portion of the body between the thread and the gripping zone is throughout its entire height of a diameter at least equal to the outer diameter of the threaded portion.

In a glow plug body of the prior art, the zone between the gripping zone and the threaded zone is still, on the threaded zone side, of a diameter less than the outer diameter of the screw thread. In general, the diameter of the zone adjacent to the threaded zone corresponds in fact to the diameter of the screw thread at the bottom of the thread.

The modification provided with respect to the body of the prior art enables an appreciable improvement in the pressure measurement carried out by the pressure sensor associated with the glow plug. This is because it has been noted that some of the extraneous signals perturbing the measurement of the pressure in the combustion chamber came from the vibration of the glow plug head. The improvement in the pressure measurement is explained not by the elimination of the vibrations of the glow plug head, but by the modification of the frequency particular to the oscillations of that head. In this way, it is possible to "move away" that particular frequency of the bandwidth of the pressure sensor and thus the vibrations of the head of the glow plug no longer perturb the measurement of the pressure made by the sensor associated with the glow plug.

In a first embodiment, the part of the body between the screw thread and the gripping zone and adjacent the screw thread has for example a diameter substantially equal to the outer diameter of the screw thread.

The part of the glow plug body between the screw thread and the gripping zone is joined for example to the gripping zone by an attachment zone having a cross-section in the form of an arc of a circle.

In a variant embodiment, the part of the body between the screw thread and the gripping zone may join to the gripping zone by a frusto-conical attachment zone.

A glow plug body according to the invention is for example formed from steel.

The present invention also concerns a glow plug comprising a pressure sensor, characterized in that it comprises a body as described above. In such a glow plug, the pressure sensor is for example located in a housing of the body situated substantially at the same height as the gripping zone.

The present invention lastly concerns an internal combustion engine, in particular an engine of Diesel type, characterized in that it comprises a glow plug as described above. This engine comprises for example an engine block and a cylinder head delimiting inside these latter at least one combustion chamber; at least one threaded bore is formed in the cylinder head, and said threaded bore advantageously receives the screw thread of a glow plug body, the gripping zone of that body being disposed outside the cylinder head.

Figure 2:
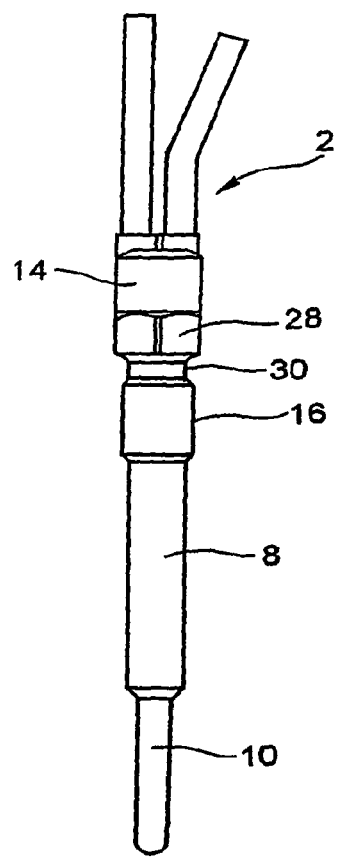
Figure 3:
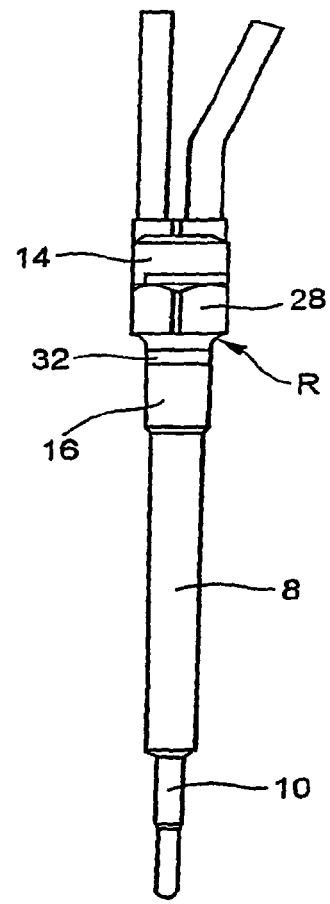
Figure 4:
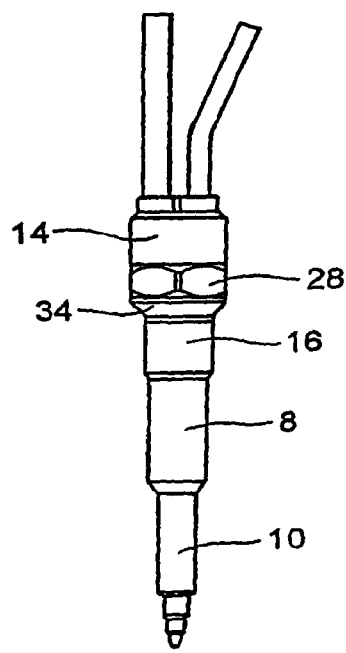

Details and advantages of the present invention will appear more clearly from the following description, made with respect to the accompanying drawings in which:

FIG. 1 is a longitudinal cross-section representing a glow plug of the prior art mounted in an engine, FIG. 2 shows another glow plug of the prior art in side view, FIG. 3 is a side view of a glow plug according to the invention, and FIG. 4 is a side view of a variant embodiment of the glow plug of FIG. 3.

FIG. 1 represents a glow plug of the prior art in longitudinal cross-section comprising a pressure sensor so as to be able to measure the pressure in an engine cylinder. This glow plug 2 is mounted in a conventional manner in an engine 4, of Diesel type, and more particularly in a cylinder head 6 of that engine. It comprises a body 8, a finger 10, a core 12 and a pressure sensor 14.

The body 8 is adapted to be fixed to the engine 4 by screwing. To that end, the cylinder head 6 comprises a threaded bore passing through it and opening into a combustion chamber of said engine 4. Concerning the body 8, this has a screw thread 16 on its other surface corresponding to the bore formed in the cylinder head 6. When the screw thread 16 cooperates with the threaded bore of the cylinder head 6, the glow plug 2 being in its mounted position in the engine 4, a portion of the body 8 extends inwardly of the engine 4, that is to say towards the combustion chamber, whereas another portion extends outwardly the engine.

The body 8 is a tubular body of steel within which are housed in particular the finger 10 and the core 12. The finger 10 projects from the tubular body 8 inside the combustion chamber. It is crimped inside the body 8 and receives a pre-heating electrode (not shown). The core 12 transmits the electrical energy to the electrode situated in the finger 10 and is thereby in contact with that electrode and is connected to the finger 10 which it extends within the body 8, and beyond, its free end enabling its electrical connection to a supply conductor.

The pressure sensor is a piezo-electric sensor. It comprises a piezo-electric element 18 disposed between two contact elements 20 of electrically conductive material, the sensor itself being electrically insulated from the rest of the glow plug 2 by electrically insulating members 22. The pressure sensor 14 comes to bear on the body 8 via a bearing part 24. The other face of the sensor comes to bear against a nut 26 fastened to the upper end of the core 12. The part of the glow plug 2 where the pressure sensor 14 is to be found and which is situated outside the engine is also termed glow plug head. At this head, the body 8 has a gripping zone 28 used for the mounting/de-mounting of the glow plug 2 with respect to the cylinder head 6. Usually, this gripping zone 28 is cylindrical and of hexagonal cross-section. In this way, using a spanner, and obtaining access from the exterior of the cylinder head 6, the mounting and the demounting of the glow plug 2 are possible. The diameter of this gripping zone 28 is, in a conventional manner, greater than that of the rest of the body 8.

In FIGS. 1 and 2 illustrating a glow plug of the prior art, a narrowing 30 of the outer diameter of the body 8 can be seen between the threaded zone, bearing the screw thread 16, and the gripping zone 28. A glow plug body 8 according to the invention does not have such a narrowing.

Thus, on the glow plugs of FIGS. 3 and 4, the outer diameter of the body 8 remains greater than the outer diameter of the screw thread 16 over the entire portion situated between that screw thread 16 and the gripping zone 28.

In the embodiment of FIG. 3, the part of the body 8 situated between the screw thread 16 and the gripping zone 28 first of all has, adjacent the screw thread 16, a portion 32 of which the outer diameter corresponds to the outer diameter of the screw thread 16. This zone 32 is connected to the gripping zone 28 by a zone of increasing diameter thus forming, in side view (or in cross-section) a line having a radius of curvature R.

In the embodiment of FIG. 4, the threaded zone of the body 8 comprising the screw thread 16 is connected to the gripping zone 28 via a frusto-conical zone 34. Adjacent the screw thread 16, this frusto-conical zone 34 has an outer diameter corresponding to the outer diameter of the screw thread 16 whereas adjacent the gripping zone 28, the base of that frustoconical zone 34 has a diameter corresponding to the diameter of the gripping zone 28. In the case of a gripping zone with six facets, a shown in the drawing, the diameter of the gripping zone 28 is considered as the distance separating two opposite facets of that zone.

The modification made to the body 8 of the glow plug makes it possible to very appreciably improve the measurement made by the pressure sensor 14. One of the extraneous noises during the measurement of a pressure by the pressure sensor 14 comes from the vibration of the glow plug head. The modification made by the present invention makes it possible, not to eliminate the extraneous vibrations, but to modify the particular frequency of vibration of the glow plug head. This modification enables that particular frequency to be no longer within the bandwidth of the pressure sensor 14. On account of this, the extraneous signals coming from the vibration of the glow plug head no longer perturb the measurements made by the pressure sensor.

Thus, by slightly modifying the body of a glow plug comprising a pressure sensor, it is possible to appreciably improve the quality of the measurement made by said sensor. This new form of body of the glow plug applies to the pressure sensors of the type represented in FIG. 1 by way of non-limiting example, as well as to other pressure sensors associated with a glow plug, whatever the manner in which the sensor is mounted on the glow plug.

The present invention is not limited to the embodiments described above by way of non-limiting example. It also concerns all the variant embodiments accessible to the person skilled in the art.

Thus, in particular, the ambit of the present invention will not be departed from by giving any particular form, other than the forms described above, to the zone between the threaded portion and the gripping zone of the glow plug body, provided the diameter of that zone remains greater than the outer diameter of the screw thread.

The invention claimed is:

1. A body (8) of a glow plug (2) comprising a pressure sensor (14), the body (8) having on its outer face both a thread (16) adapted for fixing the body (8) into a corresponding tapping of an engine (4), as well as a gripping zone (28), generally of cylindrical form with a hexagonal section, enabling gripping of the body (8) for screwing the glow plug (2) into the corresponding tapping, characterized in that the outer diameter of the portion of the body between the thread (16) and the gripping zone (28) is throughout its entire height of a diameter at least equal to the outer diameter of the threaded portion (16).

2. A body (8) of a glow plug according to claim 1, characterized in that the portion of the body between the thread (16) and the gripping zone (28) and adjacent to the thread (16) has a diameter substantially equal to the outer diameter of the thread (16).

3. A body (8) of a glow plug according to claim 1, characterized in that the portion of the body between the thread (16) and the gripping zone (28) is attached to the gripping zone (28) by an attachment zone having a section in the form of an arc of a circle (R).

4. A body (8) of a glow plug (2) according to claim 1, characterized in that the portion of the body (8) between the thread (16) and the gripping zone (28) is attached to the gripping zone by a frustoconical attachment zone (34).

5. A body (8) of a glow plug according to one claim 1, characterized in that it is made of steel.

6. A glow plug (2) comprising a pressure sensor (14), characterized in that it comprises a glow plug body (8) having on its outer face both a thread (16) adapted for fixing the body (8) into a corresponding tapping of an engine (4), as well as a gripping zone (28), generally of cylindrical form with a hexagonal section, enabling gripping of the body (8) for screwing the glow plug (2) into the corresponding tapping, wherein the outer diameter of the portion of the body between the thread (16) and the gripping zone (28) is throughout its entire height of a diameter at least equal to the outer diameter of the threaded portion (16).

7. A glow plug (2) according to claim 6, characterized in that the pressure sensor (14) is located in a housing of the body (8) situated substantially at the height of the gripping zone (28).

8. An internal combustion engine (4), in particular of the Diesel engine type, characterized in that it comprises a glow plug (2) comprising a pressure sensor (14), wherein the glow plug comprises a glow plug body (8) having on its outer face both a thread (16) adapted for fixing the body (8) into a corresponding tapping of an engine (4), as well as a gripping zone (28), generally of cylindrical form with a hexagonal section, enabling gripping of the body (8) for screwing the glow plug (2) into the corresponding tapping, wherein the outer diameter of the portion of the body between the thread (16) and the gripping zone (28) is throughout its entire height of a diameter at least equal to the outer diameter of the threaded portion (16).

9. An engine according to claim 8, characterized in that it comprises an engine block and a cylinder head (6) delimiting within these latter at least one combustion chamber, in that at least one tapped bore is made in the cylinder head (6), and in that said tapped bore receives the thread (16) of the glow plug body (8), the gripping zone (28) of that body (8) being arranged at the exterior of the cylinder head (6).

* * * * *